Jan. 24, 1961　　　A. G. JOHNSON　　　2,969,024
FLOUR DUSTING DEVICE WITH FLOUR LOOSENER
Filed Aug. 4, 1959
2 Sheets-Sheet 1
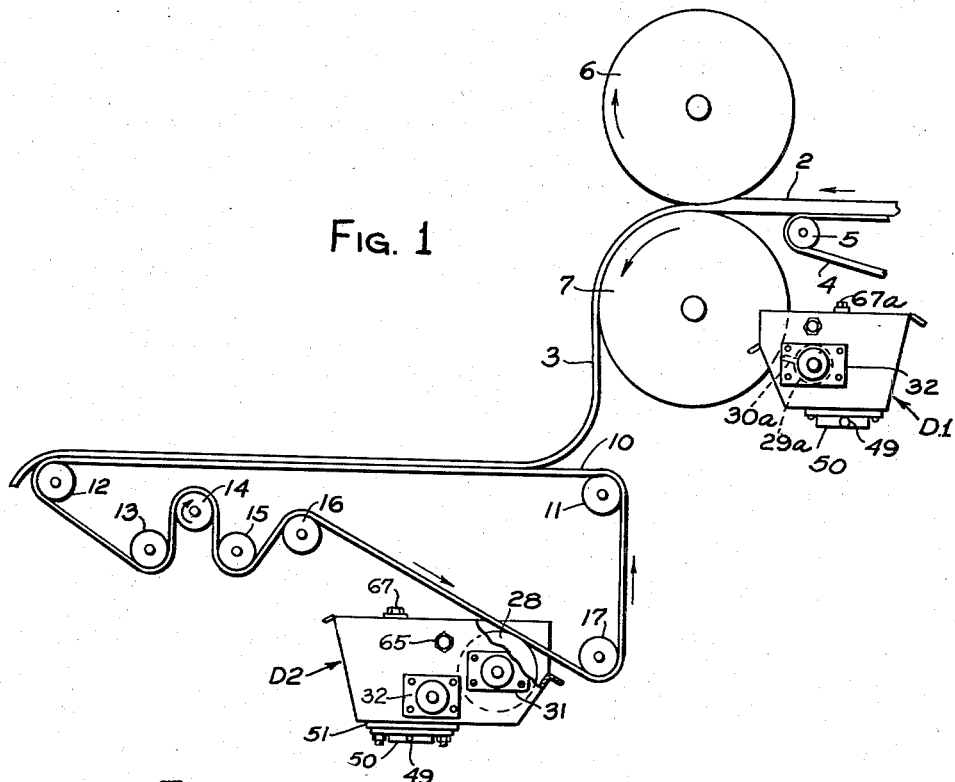
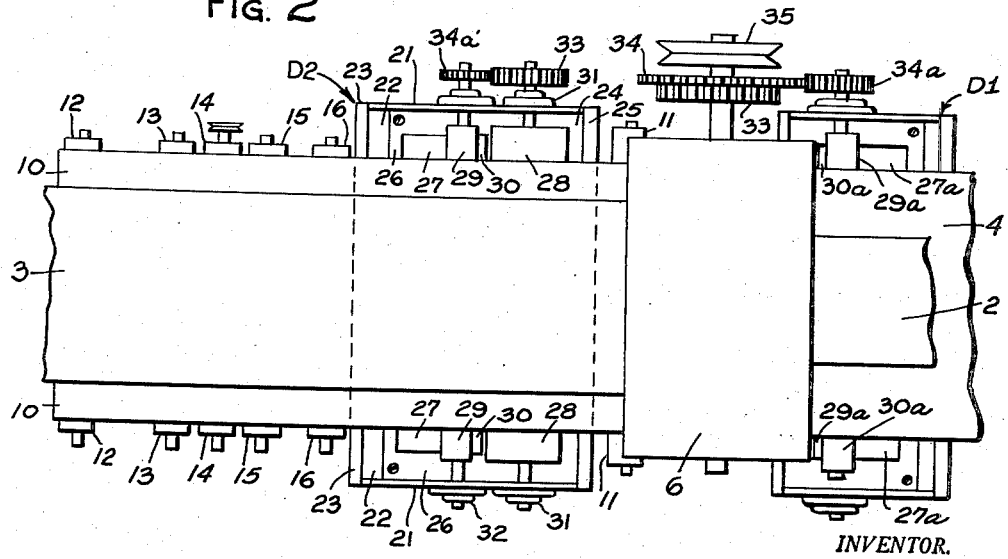
INVENTOR.
AXEL G. JOHNSON
BY
Kegan, Bellamy & Kegan
ATTORNEYS

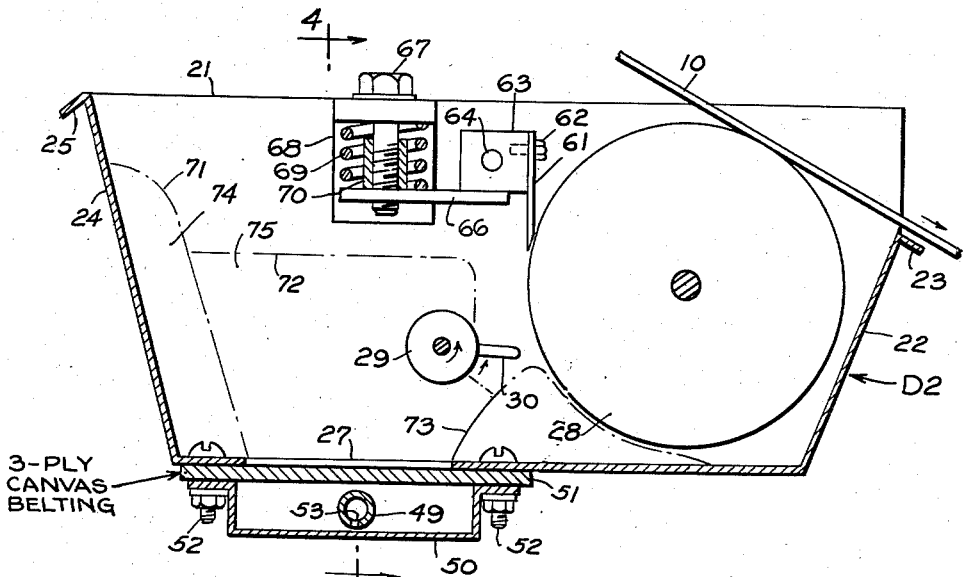

United States Patent Office 2,969,024
Patented Jan. 24, 1961

2,969,024

FLOUR DUSTING DEVICE WITH FLOUR LOOSENER

Axel Gunnard Johnson, Highland Park, Ill., assignor to Schulze and Burch Biscuit Co., Chicago, Ill., a corporation of Illinois Filed Aug. 4, 1959, Ser. No. 831,663

3 Claims. (Cl. 107—7)

This invention relates to flour dusting apparatus, being concerned more particularly with apparatus employed for applying a dust-like flour deposit to dough-transporting belts and dough-handling rollers.

A principal object of the invention is to provide a dusting device of the foregoing character, which includes suitable provisions for loosening the flour contained therein for a more efficient and uniform dusting discharge of the flour therefrom.

Heretofore, in commercial bakeries, it has been the practice to employ an elongated pan-like container for the flour which is to be applied in a dust-like coating to each continuously moving dough-carrying conveyor belt and dough-contacting roller to prevent the adherence of dough to the surface thereof. Because of the limited space available for the dusting pans, only a limited amount of dusting flour can be placed in any such pan at one time. The experience has been that the flour tends to cake or channel within the dusting pan. This terminates the dusting operation, while there is still a large quantity of flour left in the pan. Accordingly, the persons charged with maintaining the dusting pans filled with flour tend to overfill the pans, causing a very substantial wastage of flour. When a dusting pan is overfilled, to cause it to operate as intended despite the caking or channeling of the flour already contained therein, much of the flour spills on the floor, and excess flour is applied to the associated roller when the pan is filled above the level of the scraper bar contained therein.

As commonly used, each dusting pan ordinarily includes a so-called agitator, being a rod or roller extending therethrough and undergoing a fairly brisk rotation and having a vane attached which tosses the flour in successive waves toward the surface to which the flour dust is to be applied. The agitator tends to cut a channel through the flour and substantially cease agitating the flour as soon as the cut channel is emptied of loosened flour therein.

According to the invention, the foregoing and other difficulties are overcome by providing auxiliary apparatus for each flour dusting pan which maintains all or a large portion of the flour stored in the dusting pan in a loosened state in which it tends to flow generally as a liquid to avoid the above-noted channeling action and thus keep the agitator supplied with flour until the dusting pan is very nearly emptied. With this arrangement, the dusting pans need to be filled only at relatively infrequent intervals and continue to operate as intended thereafter until again very nearly emptied.

A feature of the disclosed arrangement is that the loosening action of the bulk of the flour contained in a filled dusting pan is secured by apparatus for trickling or bubbling air continuously upwardly through the flour contained in the pan, the admitted air having the apparent effect of causing the flour particles to de-cohere or to become detached from each other and to be maintained separated by a thin film of air, whereby the loosened flour tends to act generally as a liquid.

The foregoing and other objects and features of this invention and the manner of attaining them will become more apparent and the invention itself will be best understood, by reference to the following description of an embodiment of the invention taken in conjunction with the accompanying drawings comprising Figs. 1 to 4, wherein:

Fig. 1 shows a side view of a portion of a dough handling and conveying system interposed between apparatus not shown which comprises a conventional dough mixer and an oven for baking the mixed dough, such as an oven wherein crackers, cookies, and the like are baked;

Fig. 2 is a top view of the apparatus shown in Fig. 1; and

Figs. 3 and 4 are respectively an end view and a front view, each partly in section, of one of the dusting pans of Figs. 1 and 2.

Referring to Fig. 1 of the drawings showing a conventional dough conveyor system in which the invention may be used, it will be seen that the dough 2, comprising a thick mass, is deposited on belt 4 from, for example, a dough mixer. Belt 4 passes over roller or wheel 5 and may be arranged to be flour dusted and driven in a manner similar to belt 10, which will be described. The dough 2 passes between rollers 6 and 7 from belt 4. Roller 6 is arranged to be suitably powered, as indicated in Fig. 2 by the V belt pulley 35 connected thereto, and is arranged to tranfer its motion via gears 33, 34 and 34a to the flour agitator 29a and attached blade 30a in pan D1 and to roller 7.

Rollers 6 and 7 are arranged to squeeze or flatten the dough mass so that it extends laterally across belt 10, when deposited on the belt 10, after passing between rollers 6 and 7. The roller 6 has a highly polished surface to which the dough does not adhere both because of its weight and the nature of the surface. Roller 7 is provided with a dusting arrangement comprising dusting pan D1 having a flour containing chamber with a bottom aperture 27a and attendant apparatus for bubbling air through the flour contained therein and spraying the flour on roller 7. Its function will be clearly understood from the description of pan D2. The differences primarily being that roller 7 in pan D1 supplants the dusting wheel 28 in pan D2 and that the dusting pan D1 may also be provided with a felt liner or similar arrangement adjacent the periphery of roller 7 to prevent the escape of flour from the pan as it is thrown upon the roller. This is necessary as roller 7 is arranged in a somewhat different position with respect to the pan walls of D1 than wheel 28 is with respect to D2.

The dough 3 is considerably thinned by the rollers 6 and 7 and occupies most of the width of belt 10, as seen in Fig. 2. The belt 10 is supported, guided and driven by wheels 11, 12, 13, 15, 16 and 17. Wheel 14 is shown, for example, as the drive roll. It is suitably powered, as indicated, for example, by the V belt pulley indicated in Fig. 2.

The dusting pan or in D2 has mounted thereon a dusting wheel 28, an agitator 29 with blade 30 and an air distribution pan or container 50. The container 50 is mounted on the bottom of the pan D2 and contains the outlet portion of the air inlet pipe 49. Mounted between container 50 and a suitable laterally extending aperture 27, in the bottom 26 of pan D2 is a 3-ply canvas belting 51. The assembly is clamped to the bottom of pan D2 by means of bolts and nuts indicated at 52. The dusting pan D2 also contains the dusting wheel 28 having a suitably knurled surface over which the belt 10 is stretched to permit it to drive the wheel 28 and to which the flour suitably adheres. Wheel 28 is rotatably mounted in the dusting pan walls 21 by means of suitable journal 31 and extends transversely across the width of the belt 10. Wheel 28 also carries a gear 33 adapted to mesh with gear 34a' carried by the agitator wheel 29 for transferring its motion thereto. The agitator wheel 29 is also suitably mounted in sidewalls 21 and journalled at 32. Protruding from the agitator wheel 29 is the blade element 30, which is adapted to toss the flour upon the dusting wheel 28 as they both rotate.

Referring to Figs. 3 and 4, it will be seen that the pan D2 has sidewalls 22 and 24 extending transversely the full length of the belt 10. As seen in Fig. 3, it will be noted that the sidewall 22 is cut or formed lower than sidewall 24 and that each carries a flange 23 and 25 respectively. These provisions are made to accommodate the direction of travel of belt 10 and for other obvious reasons.

The flour is deposited in the pan D2 from any suitable container and the pan generally is filled to a level below its top. The container from which the pan is filled is generally similar to a bicycle pump in which a plunger is retracted to fill the pump from any suitable supply. It is carried to the pan D2 and the nozzle placed in the pan. The plunger is then operated to force the flour into the pan, while the nozzle is displaced laterally across the pan to strew the flour evenly therein.

Also mounted on the sidewalls 21 of pan D2 by means of screws 65 adapted to fit threaded apertures 64 is support 63 for a scraper or doctor blade 61. Blade 61 is attached to block 63 by means of screw 62. It is arranged to permit some adjustment of the blade 61 with respect to dusting wheel 28. Also supporting block 63 are elements 66, each threaded to receive respective bolts 67 only one being shown in Fig. 4. Surrounding each bolt 67 is a sleeve or spacer element 70 and spring 69. Disposed between the head of the screw 67 and each spring 69 is the angle bracket 68, which in turn is fixedly mounted, for example, by welding on wall 21 of the pan. This arrangement permits adjustment of the support 63 either by tightening or loosening the screws 67. The sleeve 70 is provided to prevent excessive tightening of the screw 67. With this adjustable supporting arrangement, the blade 61 is suitably adjusted with respect to wheel 28 for the purpose of removing excess flour therefrom.

Secured to the bottom wall 26 of the pan D2 in which a suitable aperture 27 has been made and to the left of the wheel 28, as seen in Fig. 3 is the 3-ply canvas belting 51 and air distribution pan 50. This arrangement extends substantially the transverse length of the pan and is under the bulk of the flour. The flour in the pan may take the shape generally indicated by the dashed lines 71, 72 and 73. The pan 50 serves to distribute the incoming air from inlet pipe 49 to the bulk of flour through the retarding medium of belt 51. The pipe 49 is provided with suitable apertures 53, which, for example, may be 1/16" holes on 1/4" centers. The pipe 49 is connected as indicated by dashed line 60 and pipe 59 to a suitable pressure gauge 58 and by means of pipe 57 to a throttle valve 56 and from there over pipe 55 to an air supply.

In operation, the belt 10 is driven by wheel 14 to carry the dough 3 from rollers 6 and 7 to the succeeding station, which may be, for example, an oven. The belt 10 passes over wheel 28 serving to drive the same. Wheel 28 in turn, drives the agitator wheel 29, whose blade 30 tosses the flour on wheel 28. The flour in turn, is transferred to the belt 10 to prevent adherence of dough to the belt. In pan D1, a similar operation takes place with respect to roller 7.

As the blade 30 rotates, it excavates the flour portion under dashed line 72. Normally with the flour caking, this would result in an excavation whose depth depended on the blade height and would leave flour bulk as indicated under dashed lines 71 and 73. With the air bubbling through the flour, as explained, coherence between the flour particles is substantially prevented with the result that the flour under dashed lines 71 and 73 collapses into the excavation formed by blade 30, thereby preventing wastage.

In addition, it will be noted that the blade 30 and wheel 29 in rotating separate the aforementioned air film from the flour particles to permit the particles to adhere to wheel 28 from which they are carried to belt 10. Thus, the air film is used to prevent flour caking, but is controlled to prevent its interference with the flour dusting function. The flour dusting arrangement in pan D1 acts, of course, in a substantially similar manner.

Having described my invention, appended hereto are a series of claims, which are believed to cover the inventive concept.

I claim:

1. A flour dusting apparatus comprising a bin for containing flour, a flour-dusting wheel, agitating means within said bin for coating said wheel with flour, an aperture in the bottom of said bin, an air pan underlying said aperture, means for introducing air under pressure into said air pan, and means extending across said aperture for retarding the upward movement of air into said flour bin, whereby said air bubbles upwardly into said flour bin to prevent the flour therein from caking in locations inaccessible to said agitating means.

2. An apparatus as recited in claim 1 wherein said retarding means comprises a canvas member.

3. An apparatus as recited in claim 2 wherein said air introducing means comprises a pipe extending into said air pan below said canvas member, said pipe having a plurality of apertures therein.

References Cited in the file of this patent

UNITED STATES PATENTS

| | | |
|---|---|---|
| 1,582,382 | Collis | Apr. 27, 1926 |
| 2,185,223 | Paynter | Jan. 2, 1940 |
| 2,434,339 | Stiles | Jan. 13, 1948 |